US009873176B2

(12) United States Patent
Neth et al.

(10) Patent No.: US 9,873,176 B2
(45) Date of Patent: Jan. 23, 2018

(54) ROTARY INDEXING MACHINE

(71) Applicant: WINEMA Maschinenbau GmbH, Grosselfingen (DE)

(72) Inventors: Eckhard Neth, Bisingen (DE); Lothar Staiger, Bisingen (DE)

(73) Assignee: WINEMA Maschinenbau GmbH, Grosselfingen (DE)

( * ) Notice: Subject to any disclaimer, the term of this patent is extended or adjusted under 35 U.S.C. 154(b) by 24 days.

(21) Appl. No.: 14/416,668

(22) PCT Filed: Jun. 11, 2013

(86) PCT No.: PCT/EP2013/062000
§ 371 (c)(1),
(2) Date: Jan. 23, 2015

(87) PCT Pub. No.: WO2014/016037
PCT Pub. Date: Jan. 30, 2014

(65) Prior Publication Data
US 2015/0174722 A1 Jun. 25, 2015

(30) Foreign Application Priority Data

Jul. 26, 2012 (DE) .......................... 10 2012 014 747

(51) Int. Cl.
*B23Q 39/04* (2006.01)
*B23B 29/24* (2006.01)
(52) U.S. Cl.
CPC ......... *B23Q 39/042* (2013.01); *B23Q 39/044* (2013.01); *Y10T 74/14* (2015.01)

(58) Field of Classification Search
CPC .... B23Q 39/042; B23Q 39/044; B23Q 3/155; B23Q 16/00; B23Q 2220/002; B23B 29/323; B23B 29/32; B23B 29/242
USPC ..................................................... 82/120, 121
See application file for complete search history.

(56) References Cited

U.S. PATENT DOCUMENTS

| 3,990,133 A | 11/1976 | Schalles et al. |
| 4,557,166 A | 12/1985 | Jauch |
| 5,768,962 A | 6/1998 | Link et al. |
| 7,036,408 B2 * | 5/2006 | Savoie .................... B24B 13/06 82/1.11 |

(Continued)

FOREIGN PATENT DOCUMENTS

| DE | 24 01 656 B1 | 5/1975 |
| DE | 32 04 886 C1 | 8/1983 |

(Continued)

OTHER PUBLICATIONS

German Search Report dated May 2, 2013 issued in corresponding DE patent application No. 10 2012 014 747.3.

(Continued)

*Primary Examiner* — Sara Addisu
(74) *Attorney, Agent, or Firm* — Posz Law Group, PLC

(57) ABSTRACT

A rotary indexing machine that includes a machining device, that has at least two machining stations and at least one pre-turn station, which are arranged at least substantially on a shared circumference in respectively a circle segment, and a motor unit, that is provided to drive the pre-turn station. The motor unit is arranged at least largely within the circle segment of the pre-turn station.

18 Claims, 4 Drawing Sheets

(56) References Cited

U.S. PATENT DOCUMENTS

Figure 1:
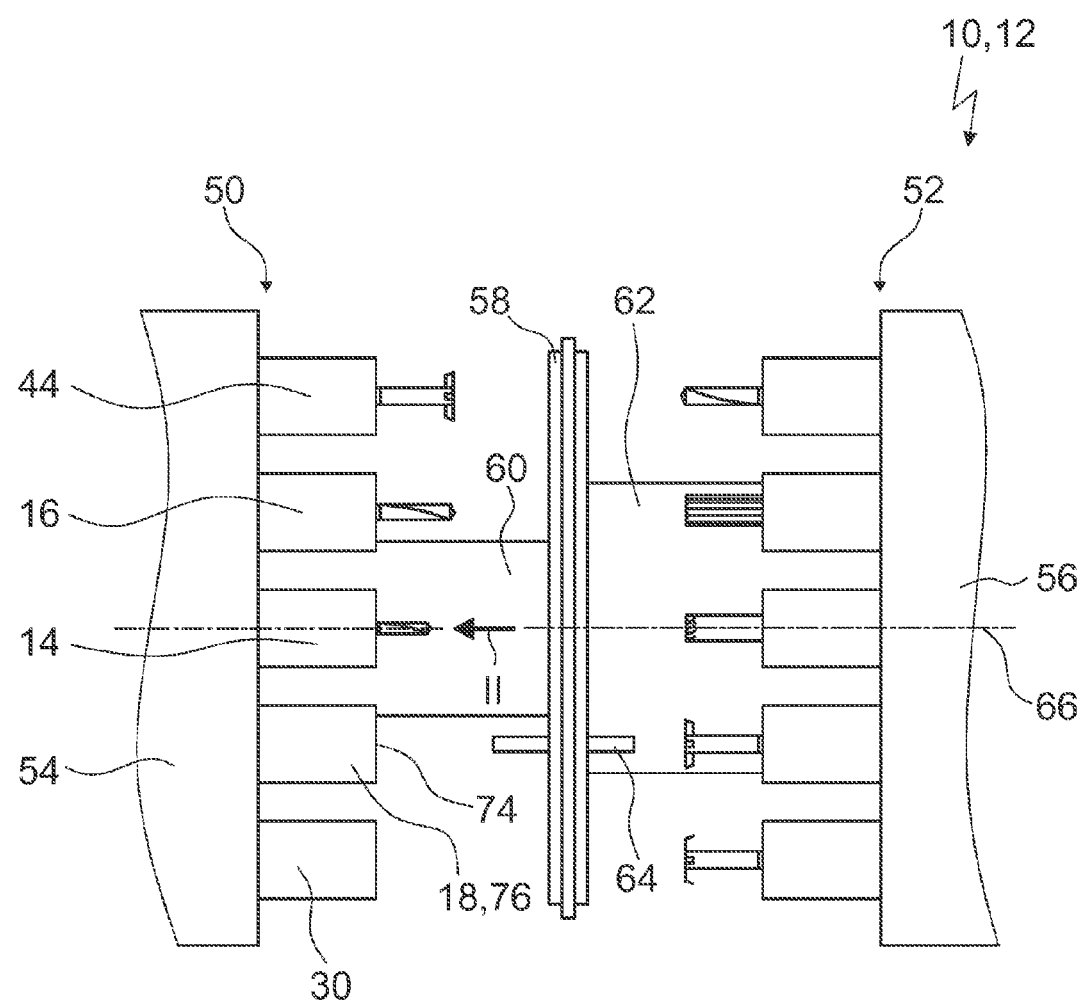

| | | | |
|---|---|---|---|
| 7,395,589 B1* | 7/2008 | Kuo | B23B 29/242 29/33 J |
| 8,246,026 B2* | 8/2012 | Hyatt | B23B 29/323 269/289 R |
| 8,297,158 B2* | 10/2012 | Watanabe | B23B 3/165 29/27 R |
| 2005/0091812 A1* | 5/2005 | Hiramoto | B23Q 1/626 29/35.5 |
| 2005/0235788 A1* | 10/2005 | Krell | B23Q 39/046 82/124 |
| 2008/0098584 A1* | 5/2008 | Meyer | B23B 29/26 29/27 C |
| 2010/0058903 A1* | 3/2010 | Rigolone | B23B 9/08 82/129 |
| 2015/0328735 A1* | 11/2015 | Lutz | B23Q 11/0042 29/558 |
| 2016/0039011 A1* | 2/2016 | Youngers | B23B 29/242 407/107 |
| 2016/0158845 A1* | 6/2016 | Cucchi | B23B 13/025 82/126 |

FOREIGN PATENT DOCUMENTS

| | | |
|---|---|---|
| DE | 38 37 279 A1 | 5/1990 |
| DE | 195 04 370 A1 | 8/1996 |
| DE | 20 2009 018 477 U1 | 1/2012 |
| WO | 98/36870 A1 | 8/1998 |

OTHER PUBLICATIONS

International Search Report of the International Searching Authority dated Aug. 6, 2013 for the corresponding International patent application No. PCT/EP2013/062000 (English language).

Written Opinion of the International Searching Authority dated Aug. 6, 2013 for the corresponding International patent application No. PCT/EP2013/062000 (partial English translation attached).

Office Action dated Jan. 16, 2017 issued in the corresponding EP Application No. 13731301.1 (and partial English translation).

* cited by examiner

ROTARY INDEXING MACHINE

CROSS REFERENCE TO RELATED APPLICATIONS

This application is a U.S. national stage application of International Patent Application No. PCT/EP2013/062000 filed on Jun. 11, 2013, and claims priority to, and incorporates by reference, German Patent Application No. 10 2012 014 747.3 filed on Jul. 26, 2012.

PRIOR ART

The invention relates to a rotary indexing machine according to the preamble of claim 1.

A rotary indexing machine comprising a machining device, that has at least two machining stations and at least one pre-turn station, which are arranged at least substantially on a shared circumference in respectively a circle segment, and comprising at least one motor unit, that is provided to drive the pre-turn station, has already been proposed.

The object of the invention consists, in particular, in providing an apparatus of the generic type having improved characteristics in terms of compactness. The object is achieved according to the invention by virtue of the features of patent claim 1, while advantageous embodiments and refinements of the invention can be derived from the subclaims.

ADVANTAGES OF THE INVENTION

The invention is based on a rotary indexing machine comprising a machining device, that has at least two machining stations and at least one pre-turn station, which are arranged at least substantially on a shared circumference in respectively a circle segment, and comprising at least one motor unit, that is provided to drive the pre-turn station.

It is proposed that the motor unit is arranged at least largely within the circle segment of the pre-turn station. By a "pre-turn station" should be understood, in particular, a station which, in at least one operating state, is provided to, prior to separation of a workpiece from a semifinished product, such as, for instance, a rod and/or a coil, and/or prior to clamping of the workpiece in a workpiece holding unit, and/or prior to machining of the workpiece by at least one machining station, perform on the workpiece at least one turning operation. For instance, the pre-turn station, in the operating state, is provided to perform the turning of the workpiece with a rotating workpiece and static machining tool and/or static machining tools. In particular, the pre-turn station, in the operating state, is provided to perform the turning of the workpiece with a static workpiece and rotating machining tool, and/or rotating machining tools. By a "shared circumference" should be understood, in particular, a circumference which comprises both the machining stations and the pre-turn station. By a "circle segment" should be understood, in particular, a segment which is delimited by at least two segment dividing lines running radially through a center point of the shared circumference. In particular, the circle segments are arranged at least substantially equally distributed over the circumference. Preferably, a number of circle segments is equal to a sum of machining stations and pre-turn stations. In particular, an angle at which the segment dividing lines delimiting the circle segment intersect is equal to a quotient of 360° and the sum of machining stations and pre-turn stations. By the phrase that the circle segments are "arranged at least substantially equally distributed over the circumference" should be understood, in particular, that a circle segment area of a respective circle segment, which circle segment area is spanned by two adjacent segment dividing lines, spanning a circle segment, and by a section of the shared circumference, which section is arranged between a respective point of intersection of the segment dividing lines, spanning the circle segment, with the shared circumference, has a magnitude which differs by less than 5%, preferably by less than 3% and, in particular, by less than 1% from a further circle segment area configured separate from the one circle segment area. By the phrase that the machining stations and the pre-turn station are "arranged at least substantially on a shared circumference of a respective circle segment" should be understood, in particular, that a transition between two adjacent circle segments is realized continuously and, in particular, steadily, wherein a radius of the shared circumference in one of the two adjacent circle segments differs by less than 5%, preferably by less than 3% and, in particular, by less than 1% from a radius of the circumference in a further circle segment, arranged separate from the one circle segment, of the two adjacent circle segments. By the phrase that the motor unit is "arranged within the circle segment of the pre-turn station" should be understood, in particular, that the motor unit is arranged 100% by weight and/or by volume within the circle segment of the pre-turn station, which circle segment is spanned by two adjacent segment dividing lines which intersect at a center point of the shared circumference. In particular, the motor unit is arranged within the circle segment of the pre-turn station such that one of the segment dividing lines spanning the circle segment of the pre-turn station runs on one side of the motor unit, and a further segment dividing line, configured separate from the one segment dividing line spanning the circle segment of the pre-turn station, runs on a further side of the motor unit that faces away from the one side of the motor unit. By the phrase that the motor unit is "arranged at least largely within the circle segment of the pre-turn station" should be understood, in particular, that the motor unit is arranged more than %, preferably more than 93% and, in particular, more than 95% by weight and/or by volume within the circle segment of the pre-turn station. By virtue of an inventive design, a space-saving construction, and thus a compact rotary indexing machine, can advantageously be achieved. Moreover, a better coupling of the motor unit to the pre-turn station can advantageously be achieved.

In a further embodiment of the invention, the rotary indexing machine comprising a machining device, that has at least two machining stations and at least one pre-turn station, which are arranged at least substantially on a shared circumference in respectively a circle segment, and comprising at least one motor unit, that is provided to drive the pre-turn station, is proposed, wherein the machining device has at least one second pre-turn station. By virtue of an inventive design, a turning can advantageously be performed on at least two workpieces at the same time, whereby savings can be made on production time, and thus on production costs.

It is further proposed that the at least two pre-turn stations are arranged directly next to one another in the circumferential direction. In particular, the at least two pre-turn stations are arranged, in the circumferential direction, in circle segments arranged directly next to one another. By the phrase that the at least two pre-turn stations are "arranged directly next to one another" in the circumferential direction should be understood, in particular, that one of the pre-turn stations is arranged in one circle segment, and a further pre-turn station, configured separate from the one pre-turn station, of the at least two pre-turn stations is arranged in a further circle segment arranged separate from the one circle segment, wherein the one circle segment and the further circle segment are separated by a segment dividing line common to both. In particular, the pre-turn stations arranged directly next to one another in the circumferential direction are arranged side by side, avoiding the arrangement of a further machining station and/or pre-turn station, in the circumferential direction, between the one pre-turn station and the further pre-turn station. By virtue of an inventive design, a simultaneous loading and machining of two workpieces can advantageously be realized side by side, whereby savings can be made on production time, and thus production costs.

In a further embodiment of the invention, the rotary indexing machine comprising a machining device, that has at least two machining stations and at least one pre-turn station, which are arranged at least substantially on a shared circumference in respectively a circle segment, and comprising at least one motor unit, that is provided to drive the pre-turn station, is proposed, wherein the pre-turn station is supported movably along a longitudinal direction of the pre-turn station. In particular, the pre-turn station is supported movably in an axial direction of the pre-turn station. By virtue of an inventive design, a flexible pre-turn station, which can be moved according to requirement, in dependence on the situation, can advantageously be achieved.

It is further proposed that the motor unit has a motor toothing, which is arranged at a distance of less than cm with respect to a toothing of the pre-turn station. For instance, the motor toothing is connected via a belt to the toothing of the pre-turn station. By virtue of an inventive design, a short distance between the motor toothing and the toothing of the pre-turn station, and thus a better coupling between the motor unit and the pre-turn station, can advantageously be achieved.

Moreover, it is proposed that the motor unit is directly toothed with at least one pre-turn station. In particular, the motor unit is provided to drive the pre-turn station by means of a gear mechanism. By the phrase that the motor unit is "directly toothed" with at least one pre-turn station should be understood, in particular, that the motor toothing of the motor unit and the toothing of the pre-turn station are in direct contact with each other. In particular, the motor unit and the pre-turn station are in direct contact with each other via the motor toothing and the toothing of the pre-turn station. For instance, the motor unit has a static section, termed the stator, which is connected by means of a gear shaft to a moving section of the motor unit, termed the rotor, which moving section comprises the motor toothing, which is in direct contact with the toothing of the pre-turn station. By virtue of an inventive design, a better coupling of the motor unit and the pre-turn station can advantageously be achieved.

It is additionally proposed that the motor unit is embodied as an external rotor motor. By an "external rotor motor" should be understood, in particular, a motor which has at least one static section, termed the stator, and at least one moving section, termed the rotor, wherein the static section termed the stator, in at least one operating state of the external rotor motor, is enclosed by the section termed the rotor. In particular, the moving section, termed the rotor, comprises the motor toothing. Preferably, the moving section, termed the rotor, in the operating state of the external rotor motor, moves around the static section, termed the stator. By virtue of an inventive design, a space-saving construction, and thus a compact rotary indexing machine, can advantageously be achieved. Moreover, a better coupling of the motor unit to the pre-turn station can advantageously be achieved.

It is further proposed that the motor unit and the pre-turn station are arranged at least largely in a shared housing. By the phrase that the motor unit and the pre-turn station are "arranged at least largely in a shared housing" should be understood, in particular, that the motor unit and the pre-turn station are respectively arranged more than 45%, preferably more than 47% and, in particular, more than 49% by weight and/or by volume in a shared housing. In particular, at least the pre-turn station or the motor unit is arranged 100% by weight and/or by volume in the shared housing. Preferably, the motor unit and the pre-turn station, in at least one operating state of the rotary indexing machine, are respectively arranged 100% by weight and/or by volume in the housing. By virtue of an inventive design, a space-saving construction, and thus a compact rotary indexing machine, can advantageously be achieved. Moreover, the motor unit and the pre-turn station are arranged securely and such that they are protected from damage by external third-party influence.

It is additionally proposed that the housing is of multipart configuration. By the phrase that the housing is of "multipart" configuration should be understood, in particular, that the housing has at least two housing sections, which, in at least one state prior to fitting of the housing, are arranged spatially separate, and which, in at least one fitted state of the housing, are connected to one another. In particular, the at least two housing sections, in the fitted state of the housing, are detachably connected to one another. For instance, the at least two housing sections, in the fitted state of the housing, are detachably connected to one another by a latching connection and/or by a screw joint. By virtue of an inventive design, fitting of the rotary indexing machine can advantageously be facilitated, and thus production costs saved.

It is further proposed, that the motor unit is arranged at least substantially in a region spanned by a longitudinal extent of the pre-turn station. By the phrase that the motor unit is "arranged in a region spanned by a longitudinal extent of the pre-turn station" should be understood, in particular, that if the motor unit and the pre-turn station are projected, in a projection direction oriented perpendicular to the longitudinal extent of the pre-turn station, into a plane common to both, then the motor unit has in this plane an extent parallel to the longitudinal extent of the pre-turn station, wherein the longitudinal extent of the motor unit in the plane is arranged between two opposite ends of the pre-turn station, which ends are separated by the longitudinal extent of the pre-turn station. By the phrase that the motor unit is "arranged at least substantially in a region spanned by a longitudinal extent of the pre-turn station" should be understood, in particular, that the longitudinal extent of the motor unit in the plane is arranged more than 90%, preferably more than 95% and, in particular, more than 97% between the two opposite ends of the pre-turn station, which ends are separated by the longitudinal extent of the pre-turn station. By virtue of an inventive design, a space-saving construction, and thus a compact rotary indexing machine, can advantageously be achieved. Moreover, a better coupling of the motor unit to the pre-turn station can advantageously be achieved.

Moreover, it is proposed that a distance of the motor unit from an end of the pre-turn station that is embodied as a workpiece inlet is at least greater than 10% of the longitudinal extent of the pre-turn station. In particular, the distance of the motor unit from an end of the pre-turn station which is embodied as a workpiece inlet is greater than a distance of the motor unit from an end of the pre-turn station which is embodied as a workpiece outlet. Preferably, the motor unit is arranged, with respect to a longitudinal direction of the pre-turn station that heads out from an end of the pre-turn station which is embodied as a workpiece inlet, in a front region of the pre-turn station. By virtue of an inventive design, a space-saving construction, and thus a compact rotary indexing machine, can advantageously be achieved. Moreover, a better coupling of the motor unit to the pre-turn station can advantageously be achieved.

It is additionally proposed that the machining device comprises at least five machining stations. In particular, the machining device has at least eight machining stations. By virtue of an inventive design, a workpiece can advantageously be machined according to requirement and in a varied manner.

It is further proposed that the shared circumference has a radius of less than 220 mm. By virtue of an inventive design, a space-saving construction, and thus a compact rotary indexing machine, can advantageously be achieved. Moreover, a better coupling of the motor unit to the pre-turn station can advantageously be achieved.

In a further embodiment of the invention, a method with a rotary indexing machine according to the invention is proposed, wherein, in at least one indexing process, at least one workpiece is displaced in the circumferential direction by at least two circle segments. By virtue of an inventive design, a twin and/or dual production can advantageously be achieved, whereby a rapid machining of the at least one workpiece can be achieved. Moreover, a space-saving construction, and thus a compact rotary indexing machine, can advantageously be achieved.

DRAWINGS

Further advantages emerge from the following description of the drawings. In the drawings, an illustrative embodiment of the invention is represented. The drawings, the description and the claims contain numerous features in combination. The person skilled in the art will expediently also view the features individually and group them into sensible further combinations.

Figure 2:
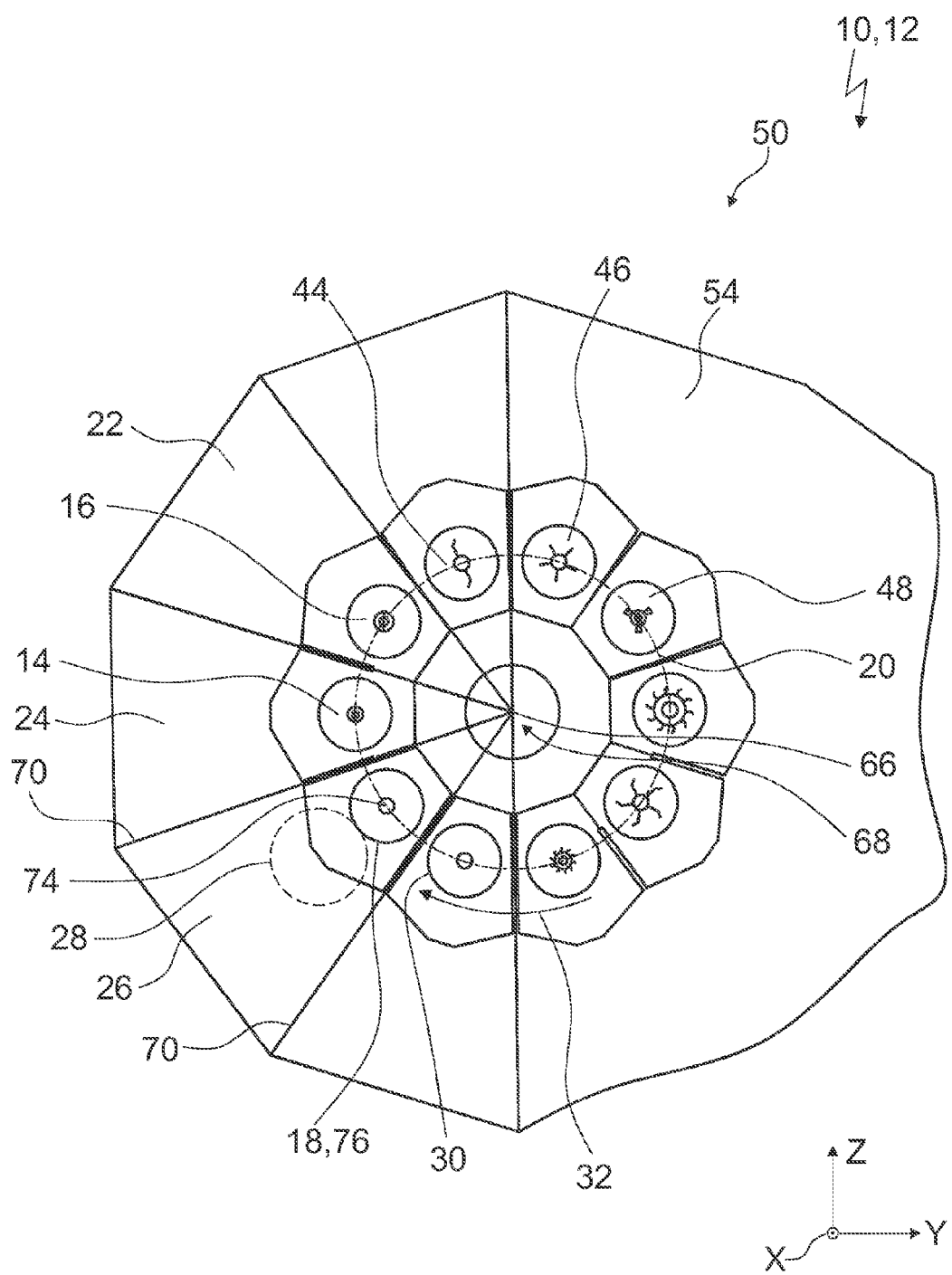
Figure 3:
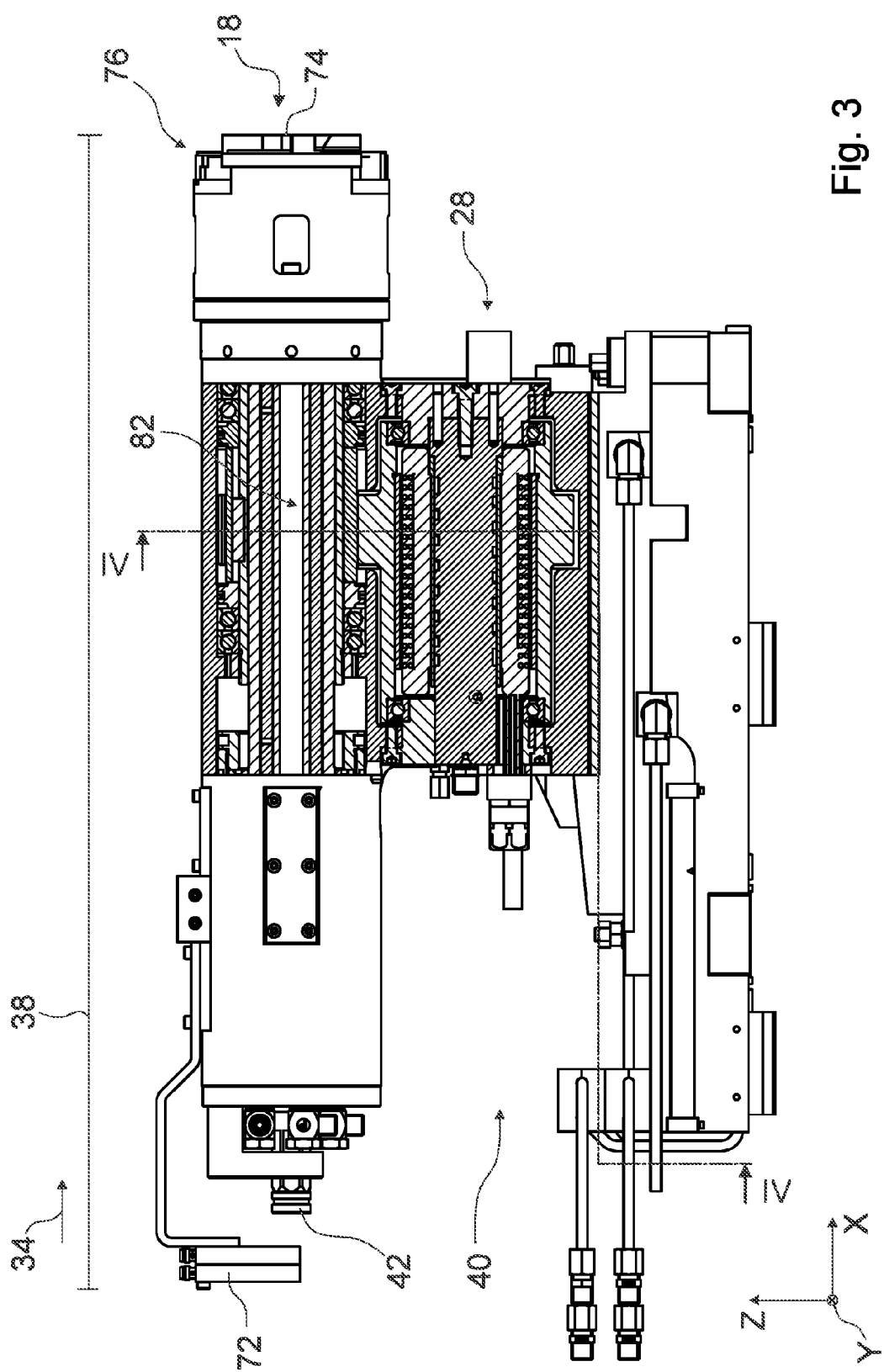
Figure 4:
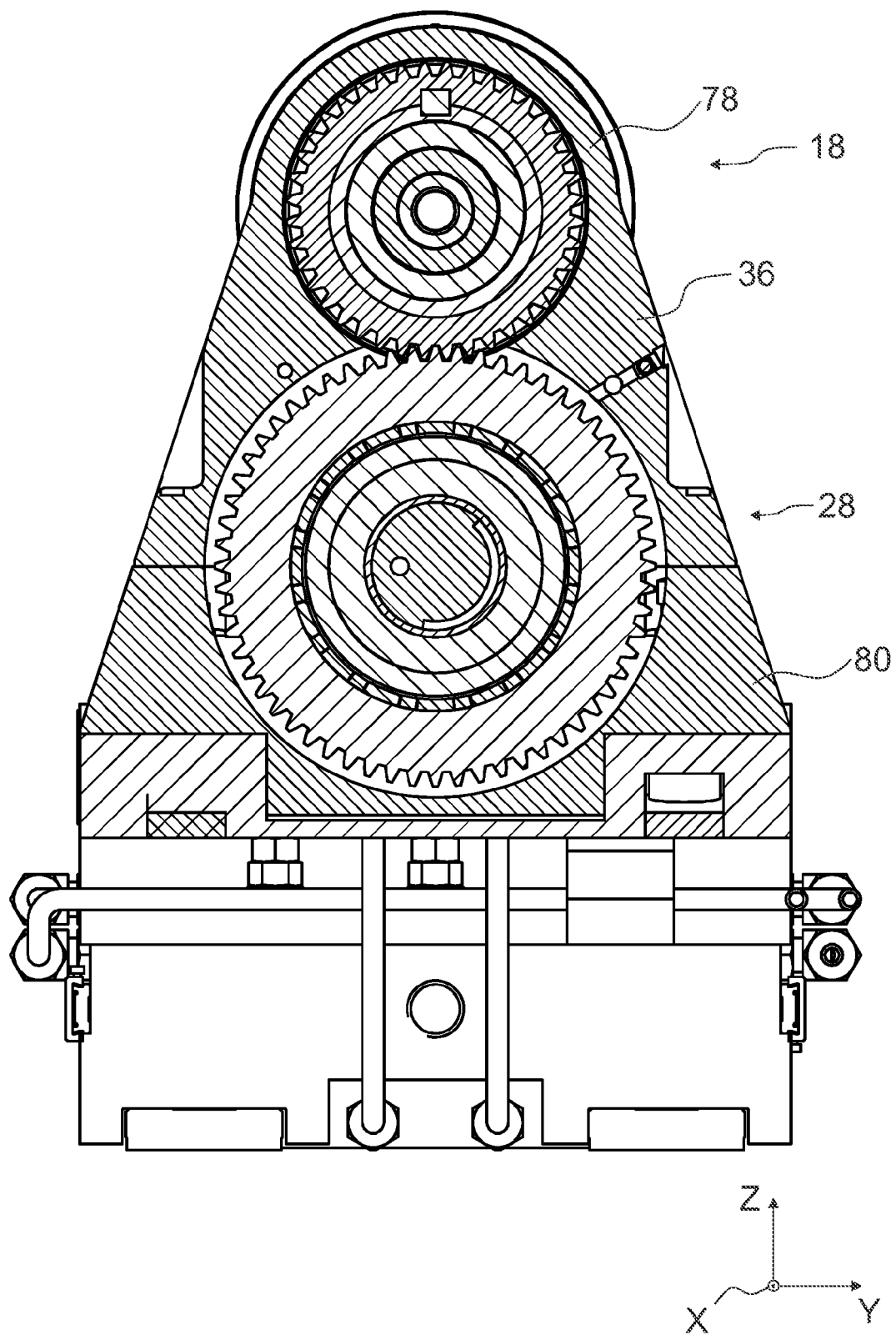

FIG. 1 shows a rotary indexing machine according to the invention in a side view in schematic representation, FIG. 2 shows a detail from a view of the rotary indexing machine according to the invention from FIG. 1, with direction of view according to II, in schematic representation, FIG. 3 shows a pre-turn station according to the invention, with a motor unit according to the invention, in partial sectional representation, and FIG. 4 shows a section through the axis IV-IV from FIG. 3.

DESCRIPTION OF THE ILLUSTRATIVE EMBODIMENT

FIG. 1 shows a rotary indexing machine 10 according to the invention in a side view in schematic representation. According to the invention, it is provided that the rotary indexing machine 10 is equipped with a machining device 12, which has at least two machining stations 14, 16 and at least one pre-turn station 18, which are arranged at least substantially on a shared circumference 20 in respectively a circle segment 22, 24, 26, and with a motor unit 28, which is provided to drive the pre-turn station 18. In the shown illustrative embodiment, the machining device 12 has a second pre-turn station 30. The machining device 12 comprises two machining device parts 50, 52, which lie opposite each other with respect to a spatial direction x. The machining device parts 50, 52 respectively have a station mounting element 54, 56 embodied as a polygon (cf. also FIG. 2). In principle, it is also conceivable, however, for the station mounting elements 54, 56 to have a different shape, such as, for instance, a round shape.

In the machining device part 50, the machining device 12 has eight machining stations 14, 16, 44, 46, 48. Of the eight machining stations 14, 16, 44, 46, 48, only three machining stations 14, 16, 44 are represented in FIG. 1, since the further machining stations 46, 48 are concealed by the represented machining stations 14, 16, 44 and by the represented pre-turn stations 18, 30. For the sake of clarity, moreover, only five of the machining stations 14, 16, 44, 46, 48 in total are provided with reference symbols. In addition, the machining device 12 has in the machining device part 50 the two pre-turn stations 18, 30, wherein the two pre-turn stations 18, 30 are arranged directly next to each other in the circumferential direction 32. In the machining device part 52, the machining device 12 has ten machining stations, which, for the sake of clarity, acquire no reference symbols. The machining device 12 thus has eighteen machining stations 14, 16, 44, 46, 48 in total. In principle, any combination and arrangement of pre-turn stations and machining stations which appears sensible to a person skilled in the art is conceivable, so that twenty stations in total are attained. In FIGS. 1 and 2, with respect to the spatial direction x, only those machining regions of the machining stations 14, 16, 44, 46, 48 and of the pre-turn stations 18, 30 which are facing toward a workpiece holding unit 58 are represented. Those remaining regions of the machining stations 14, 16, 44, 46, 48 and of the pre-turn stations 18, 30 which are arranged separate from the machining regions are concealed by the station mounting elements 54, 56, so that these are not represented.

With respect to the spatial direction x, the workpiece holding unit 58 is arranged roughly midway between the two machining device parts 50, 52. The workpiece holding unit 58 is respectively placed, by virtue of a workpiece holding unit attachment 60, 62, roughly midway between the two machining device parts 50, 52. The respective workpiece holding unit attachment 60, 62 engages respectively in a recess 68 of the respective station mounting element 54, 56 (cf. FIG. 2). The workpiece holding unit 58 has a plurality of openings (not represented), which are respectively provided to each receive a workpiece 64. The workpieces 64 arranged in the openings are clamped in the openings by grippers (not represented), so that the workpieces 64 are arranged stably in the openings. In FIG. 1, only the workpiece 64 is represented by way of example, wherein the workpiece holding unit 58, in the shown illustrative embodiment, can receive a total of ten workpieces 64 at the same time. Thus, in the rotary indexing machine 10 according to the invention, ten workpieces 64 can be simultaneously machined from two mutually opposing sides of the respective workpiece 64 to be machined. The workpiece holding unit 58 is arranged such that the openings of the workpiece holding unit 58, in at least one operating state of the rotary indexing machine 10, come to lie roughly level with tools (represented by way of example) of the machining stations 14, 16, 44, 46, 48, so that a workpiece 64 arranged on the workpiece holding unit 58 can advantageously be machined. The openings are arranged at the height of the shared circumference 20 of the machining stations 14, 16, 44, 46, 48 and of the pre-turn stations 18, 30. In the shown illustrative embodiment, the shared circumference 20 has a radius of less than 220 mm. In the shown illustrative embodiment, the radius of the shared circumference 20 measures 185 mm.

In an application of a method according to the invention comprising the rotary indexing machine 10 according to the invention, it is possible for the workpieces 64 to be displaced in the circumferential direction 32 by two circle segments 22, 24 in an indexing process. Alternatively, it is conceivable for the workpieces 64 to be displaced in the circumferential direction 32 by three circle segments 22, 24, 26 in the indexing process. A number of circle segments 22, 24, 26 by which the workpieces 64, in the indexing process, are displaced in the circumferential direction 32 is adjustable. In the method according to the invention, the workpiece holding unit 58, together with the workpieces 64 present in the workpiece holding unit 58, is rotated about a rotational axis 66. The rotational axis 66 runs roughly centrally through the workpiece holding unit 58 and through the two machining device parts 50, 52.

FIG. 2 shows a detail from a view of the rotary indexing machine 10 according to the invention from FIG. 1, with direction of view according to the arrow II, in schematic representation. FIG. 2 illustrates that the two pre-turn stations 18, 30 are arranged directly next to each other in the circumferential direction 32. As already mentioned in the introduction, in FIGS. 1 and 2, with respect to the spatial direction x, only those machining regions of the machining stations 14, 16, 44, 46, 48 and of the pre-turn stations 18, 30 which are facing toward the workpiece holding unit 58 are represented. Remaining regions of the machining stations 14, 16, 44, 46, 48 and of the pre-turn stations 18, 30 are concealed by the respective station mounting elements 54, 56. For illustration purposes, in FIG. 2 the motor unit 28 of the pre-turn station 18 is, however, represented in dashed lines. An arrangement of a motor unit of the pre-turn station 30, which motor unit is embodied identically to the motor unit 28 of the pre-turn station 18, is analogous to the arrangement of the motor unit 28 of the pre-turn station 18. Therefore, only the motor unit 28 of the pre-turn station 18 is described below.

From FIG. 2 can be gathered that the motor unit 28 is arranged within the circle segment 26 of the pre-turn station 18. The circle segments 22, 24, 26 are respectively formed by segment dividing lines 70. For the sake of clarity, of the segment dividing lines 70, only those segment dividing lines 70 which span the circle segment 26 of the pre-turn station 18 are provided with reference symbols. The motor unit 28 is provided to drive the pre-turn station 18 by means of a gear mechanism. In the shown illustrative embodiment, the motor unit 28 is embodied as an external rotor motor. The motor unit 28 and the pre-turn station 18 shall be described in greater detail with reference to FIGS. 3 and 4. The following description is confined substantially to features which are fundamental to an explanation of the invention, wherein a description of features which are not fundamental to the invention is dispensed with for the sake of clarity of representation.

FIG. 3 shows the pre-turn station 18 according to the invention, with the motor unit 28 according to the invention, in partial sectional representation. The pre-turn station 18 is here represented in sectional representation only in a region in which the motor unit 28 is arranged. By contrast, the motor unit 28 is shown in its entirety in sectional representation. The pre-turn station 18 has a workpiece inlet 42, via which, in the operating state of the rotary indexing machine 10, workpieces 64 can be fed to the pre-turn station 18 for the performance of a turning operation. In addition, the pre-turn station 18 has a workpiece pusher 72, by means of which the pre-turn station 18 can move the workpiece 64 fed to the pre-turn station 18 in a longitudinal direction 34. The workpiece pusher 72 is arranged in a region of the workpiece inlet 42 on the pre-turn station 18. By the workpiece pusher 72, the workpiece 64 fed to the pre-turn station 18 can hence be moved in the longitudinal direction 34 through the pre-turn station 18 to a workpiece outlet 74.

The workpiece outlet 74 is arranged at that end of the pre-turn station 18 which is arranged opposite to the workpiece inlet 42. Between the workpiece inlet 42 and the workpiece outlet 74 is arranged a workpiece lead-through channel 82, of which only a section is visible in FIG. 3. The workpiece lead-through channel 82 allows the workpiece 64 to be moved through the pre-turn station 18 by means of the workpiece pushers 72. The workpiece outlet 74 is arranged in the machining region 76 of the pre-turn station 18. In the machining region of the pre-turn station 18, both a gripper for releasable fixing of the workpiece 64 fed to the pre-turn station 18 and turning tools for performing the turning operation are arranged (not represented). The turning operation in the machining region 76 of the pre-turn station 18 is realized in a known manner, so that a more detailed representation is dispensed with below. Brief reference shall be made only to differences relative to the known working method of the turning operation. In the pre-turn station 18 according to the invention, the turning operation is realized such that the machining tools arranged in the machining region 76 of the pre-turn station 18 rotate about the workpiece 64 releasably fixed by the gripper and fed to the pre-turn station 18. In order to be able to machine the workpiece 64 over an entire longitudinal extent of the workpiece 64 there is provided the workpiece pusher 72, which moves the workpiece 64 in the direction of the workpiece outlet 74 of the pre-turn station 18 as soon as a region of the longitudinal extent of the workpiece 64, which region is located in the machining region 76 of the pre-turn station 18, is finished. Following completed movement by the workpiece pusher 72, the workpiece 64 is found in a further region, arranged separate from the one region, of the longitudinal extent of the workpiece 64 in the machining region 76 of the pre-turn station 18. By the pre-turn station 18 according to the invention, the workpiece 64 can thus be machined along the entire longitudinal extent of the workpiece 64. Advantageously, an unworked region due to clamping of the workpiece 64 in the unworked region can be avoided.

The motor unit 28 is arranged in a region 40 spanned by a longitudinal extent 38 of the pre-turn station 18. In that position of the motor unit 28, relative to the pre-turn station 18, which is represented in FIG. 3, a distance of the motor unit 28 from an end of the pre-turn station 18 which is embodied as a workpiece inlet 42 is greater than 10% of the longitudinal extent 38 of the pre-turn station 18. The motor unit 28 is arranged in a front region of the pre-turn station 18 with respect to the longitudinal direction 34. In that position of the motor unit 28, relative to the pre-turn station 18, which is represented in FIG. 3, only the machining region 76 of the pre-turn station 18 is arranged in front of the motor unit 28 with respect to the longitudinal direction 34. The pre-turn station 18 is supported movably along the longitudinal direction 34 of the pre-turn station 18, so that a position of the motor unit 28 relative to the pre-turn station 18 with respect to the longitudinal direction 34 is variable.

Hence the pre-turn station 18 is supported movably in an axial direction oriented parallel to the longitudinal extent 38 of the pre-turn station 18.

As already represented in FIG. 2, the motor unit 28 is arranged close up against the pre-turn station 18.

According to the invention, it is provided that the motor unit 28 has a motor toothing, which is arranged at a distance of less than 10 cm with respect to a toothing of the pre-turn station 18. According to the invention, it is thus conceivable for the motor toothing to be connected via a belt to the toothing of the pre-turn station 18. Based on a combined viewing of FIGS. 3 and 4, it can be seen that the motor unit 28 is directly toothed with the pre-turn station 18. Hence the motor unit 28 and the pre-turn station 18 are arranged in direct contact. The direct contact between the motor unit 28 and the pre-turn station 18 is established via the motor toothing of the motor unit 28 and the toothing of the pre-turn station 18. The inventive arrangement of the motor unit 28 and the pre-turn station 18 opens up the possibility that the motor unit 28 and the pre-turn station 18 are arranged at least largely in a shared housing 36 (cf. FIG. 4).

FIG. 4 shows a section through the axis IV-IV from FIG. 3. With reference to FIG. 4, it can be recognized that the pre-turn station 18 is wholly arranged in the shared housing 36. The housing 36 is of multipart configuration. The housing 36 comprises two housing sections 78, 80, which, in the operating state of the rotary indexing machine 10, are detachably connected to each other. The pre-turn station 18 is wholly arranged in the housing section 78. Moreover, the motor unit 28 is about 50% arranged in the housing section 78. A residual percentage, embodied separate from the one percentage, of the motor unit 28 is arranged in the housing section 80. As already mentioned, the motor unit 28 is embodied as an external rotor motor, as is evident in FIG. 4. A static section, termed the stator, of the motor unit 28 is enclosed by a section, termed the rotor, of the motor unit 28. The moving section, termed the rotor, of the motor unit 28 comprises the motor toothing and is in direct contact with the toothing of the pre-turn station 18. In the operating state of the rotary indexing machine 10, the moving section, termed the rotor, of the motor unit 28 moves around the static section, termed the stator, of the motor unit 28. As a result of this movement of the section, termed the rotor, of the motor unit 28, the pre-turn station 18 is driven by the motor unit 28.

REFERENCE SYMBOLS 10 rotary indexing machine
12 machining device
14 machining station
16 machining station
18 pre-turn station
20 circumference
22 circle segment
24 circle segment
26 circle segment
28 motor unit
30 pre-turn station
32 circumferential direction
34 longitudinal direction
36 housing
38 longitudinal extent
40 region
42 workpiece inlet
44 machining station
46 machining station
58 machining station
50 machining device part
52 machining device part
54 station mounting element
56 station mounting element
58 workpiece holding unit
60 workpiece holding unit attachment
62 workpiece holding unit attachment
64 workpiece
66 rotational axis
68 recess
70 segment dividing line
72 workpiece pusher
74 workpiece outlet
76 machining region
78 housing section
80 housing section
82 workpiece lead-through channel

The invention claimed is:

1. A rotary indexing machine comprising:
a machining device that has at least two machining stations and at least one pre-turn station configured to, prior to machining a workpiece by the at least two machining stations, perform at least one turning operation on the workpiece, each of the at least two machining stations and the at least one pre-turn station are arranged on one circular circumference and located in different circle segments of the circular circumference; and
a motor unit provided to drive the pre-turn station, the motor unit being arranged within the circle segment of the pre-turn station.

2. The rotary indexing machine as claimed in claim 1, wherein
the machining device has at least one second pre-turn station.

3. The rotary indexing machine as claimed in claim 2, wherein
the at least two pre-turn stations are arranged directly next to one another in a circumferential direction.

4. A method for operating a rotary indexing machine according to claim 2, wherein, in at least one indexing process, at least one workpiece is displaced in a circumferential direction by at least two circle segments.

5. The rotary indexing machine as claimed in claim 2, wherein
the second pre-turn station is supported movably along a longitudinal direction of the second pre-turn station.

6. The rotary indexing machine as claimed in claim 2, further comprising a shared housing that substantially encloses the motor unit and the second pre-turn station.

7. The rotary indexing machine as claimed in claim 1, wherein
the pre-turn station is supported movably along the longitudinal direction of the pre-turn station.

8. The rotary indexing machine as claimed in claim 1, wherein
each of the at least one pre-turn stations include a gearing that protrudes from each of the at least one pre-turn stations, and
the motor unit has a motor gearing that protrudes from the motor unit and that is arranged at a distance of less than 10 cm from the gearing of the pre-turn station to the motor gearing of the motor unit.

9. The rotary indexing machine as claimed in claim 8, wherein
the motor unit is directly toothed with at least one pre-turn station.

10. The rotary indexing machine as claimed in claim 1, wherein
the motor unit is an external rotor motor.

11. The rotary indexing machine as claimed in claim 1, further comprising a shared housing that substantially encloses the motor unit and the at least one pre-turn station.

12. The rotary indexing machine as claimed in claim 11, wherein
the shared housing comprises at least two housing sections, that are in at least one fitted state of the housings detachably connected to one another.

13. The rotary indexing machine as claimed in claim 1, wherein
the machining device comprises at least five machining stations.

14. The rotary indexing machine as claimed in claim 1, wherein
the circular circumference has a radius of less than 220 mm.

15. The rotary indexing machine as claimed in claim 1, wherein
the machining device comprises at least five machining stations.

16. The rotary indexing machine as claimed in claim 1, wherein the pre-turn station performs the at least one turning operation on the workpiece prior to separation of the workpiece from a semifinished product.

17. The rotary indexing machine as claimed in claim 1, wherein the motor unit includes a rotor that encloses a stator and a motor gearing that is engaged in direct contact with a gearing of the pre-turn station.

18. The rotary indexing machine as claimed in claim 1, wherein the pre-turn station includes a machining region and a gripper that releasably fixes the workpiece fed to the pre-turn station and turning tools and that performs the at least one turning operation of the workpiece.

* * * * *